United States Patent
Rhodes (10) Patent No.: US 12,211,331 B2
(45) Date of Patent: Jan. 28, 2025

(54) AUTOMATIC HANDLING OF MIS-DELIVERED ITEMS IN COMPUTERIZED PARCEL LOCKER SYSTEMS

(71) Applicant: Quadient Technologies France, Bagneux (FR)

(72) Inventor: Vaughn Rhodes, Pleasant Grove, UT (US)

(73) Assignee: Quadient Technologies France, Bagneux (FR)

( * ) Notice: Subject to any disclaimer, the term of this patent is extended or adjusted under 35 U.S.C. 154(b) by 7 days.

(21) Appl. No.: 17/994,757

(22) Filed: Nov. 28, 2022

(65) Prior Publication Data
US 2023/0316836 A1    Oct. 5, 2023

Related U.S. Application Data

(60) Provisional application No. 63/362,413, filed on Apr. 4, 2022.

(51) Int. Cl.
*G06Q 10/0836* (2023.01)
*G07C 9/00* (2020.01)

(52) U.S. Cl.
CPC ..... *G07C 9/00896* (2013.01); *G06Q 10/0836* (2013.01); *G07C 2009/0092* (2013.01)

(58) Field of Classification Search
CPC ........ G07C 9/00896; G07C 2009/0092; G07C 2209/08; G07C 9/00912; G06Q 10/0836; A47G 2029/145; A47G 29/141
See application file for complete search history.

(56) References Cited

U.S. PATENT DOCUMENTS 6,862,576 B1    3/2005    Turner
7,653,457 B2    1/2010    Bloom
(Continued)

FOREIGN PATENT DOCUMENTS

CN    202501903 U    10/2012
DE    10246650 A1    4/2004
(Continued)

OTHER PUBLICATIONS

Hyperconnected City Logistics: Smart Lockers Terminals & Last Mile Delivery Networks, Louis Faugere and Benoit Montreuil, 3rd International Physical Internet Conference, Atlanta, GA (Jun. 29-Jul. 1, 2016). (Year: 2016).*

(Continued)

*Primary Examiner* — George Chen
*Assistant Examiner* — Stephanie S. Wallick
(74) *Attorney, Agent, or Firm* — Butzel Long (57) ABSTRACT

An automated computerized parcel locker system is provided, which includes multiple lockers in a common housing, each having one or more sensors that indicate whether an item is present in the locker, the status of the locker door, and the like. The parcel locker system includes routines that allow for automatic processing of parcels delivered to an incorrect locker, missing parcels, objects other than delivered parcels placed into the lockers, and the like. The routines also allow for automated and semi-automated management, servicing, and use of the lockers, for example to indicate to a courier or other user which lockers are available for delivery and which contain delivered parcels.

12 Claims, 4 Drawing Sheets

(56) References Cited

U.S. PATENT DOCUMENTS

| | | |
|---|---|---|
| 8,370,307 B2 | 2/2013 | Wolfe |
| 9,811,784 B2 | 11/2017 | Wan |
| 11,468,393 B1 | 10/2022 | Kalathil |
| 2002/0035515 A1 | 3/2002 | Moreno |
| 2003/0025590 A1 | 2/2003 | Gokcebay |
| 2004/0015393 A1 | 1/2004 | Fong |
| 2005/0068178 A1 | 3/2005 | Lee |
| 2009/0326808 A1 | 12/2009 | Blanton |
| 2010/0004960 A1 | 1/2010 | Frankenberg |
| 2011/0025181 A1 | 2/2011 | Vinke |
| 2012/0326840 A1 | 12/2012 | Frankenberg |
| 2013/0144428 A1 | 6/2013 | Irwin |
| 2013/0261792 A1 | 10/2013 | Gupta |
| 2014/0034727 A1 | 2/2014 | Hancock |
| 2014/0258168 A1 | 9/2014 | Crawford |
| 2014/0279658 A1 | 9/2014 | Lievens |
| 2015/0106296 A1* | 4/2015 | Robinson ........... G06Q 10/0838 |
| | | 705/339 |
| 2015/0149772 A1 | 5/2015 | Leavy |
| 2015/0158679 A1 | 6/2015 | Lossov |
| 2015/0186840 A1* | 7/2015 | Torres .................... A47F 10/02 |
| | | 705/339 |
| 2015/0371187 A1* | 12/2015 | Irwin ..................... G07F 17/13 |
| | | 705/72 |
| 2016/0025549 A1* | 1/2016 | Motoyama ........... G06Q 20/208 |
| | | 177/1 |
| 2016/0066733 A1 | 3/2016 | Gozar |
| 2016/0335595 A1 | 11/2016 | Levy |
| 2018/0365641 A1 | 12/2018 | Zhu |
| 2019/0102962 A1* | 4/2019 | Miller ................ G07C 9/00309 |
| 2019/0114859 A1* | 4/2019 | Fee .................... G07C 9/00912 |
| 2019/0130349 A1 | 5/2019 | Ferguson |
| 2019/0197809 A1* | 6/2019 | Razzoli .................... G07C 9/38 |
| 2020/0219051 A1* | 7/2020 | Karpenko .......... G06Q 10/0833 |
| 2021/0183198 A1 | 6/2021 | Estill |
| 2021/0201258 A1 | 7/2021 | Perez |
| 2022/0196412 A1 | 6/2022 | Lee |

FOREIGN PATENT DOCUMENTS

| | | |
|---|---|---|
| EP | 3723014 A1 | 10/2020 |
| GB | 2352073 | 1/2001 |

OTHER PUBLICATIONS

Extended European Search Report issued in App. No. EP23305493, dated Jul. 21, 2023, 9 pages.
Extended European Search Report for App. No. EP23307072, dated Mar. 25, 2024, 13 pages.

* cited by examiner

AUTOMATIC HANDLING OF MIS-DELIVERED ITEMS IN COMPUTERIZED PARCEL LOCKER SYSTEMS

CROSS-REFERENCE TO RELATED APPLICATIONS

The present application claims the priority benefit of U.S. Provisional Application No. 63/362,413, filed Apr. 4, 2022, the entire content of which is incorporated by reference in its entirety.

BACKGROUND

A parcel locker device typically includes multiple lockers configured to receive one or more parcels for delivery to recipients. When a courier delivers a parcel to the locker device, the locker will indicate a specific locker in which the parcel should be placed based on a running list of available or occupied lockers. Parcel locker systems are seeing increased use, especially in multi-recipient locations such as apartment complexes, business offices and business parks, gated communities, retirement communities, retail stores, universities, and the like. In a conventional parcel locker system, parcels are delivered to a common locker device, which automatically identifies an available locker in which a courier is instructed to place a parcel for retrieval by the individual recipient.

SUMMARY

A computerized automated parcel locker system is provided which includes a plurality of lockers disposed within a common housing, each of which has an associated sensor that provides a signal indicating whether the associated locker is empty or contains an item; a user interface capable of providing information about each of the plurality of lockers based on the signal provided by each of the plurality of sensors; and a computerized controller configured to determine whether items are present in the lockers and automatically update the availability of each locker.

DETAILED DESCRIPTION

Conventional parcel locker devices and systems suffer from problems addressing mis-delivered or otherwise unreceived items, mis-use by recipients, and other drawbacks. For example, during delivery of a parcel by a carrier, the carrier may place the parcel into the wrong locker. This may occur when the parcel locker device has multiple lockers open such as when recipients did not close locker doors when retrieving prior-delivered parcels, or because there are other recipients, couriers, property managers, or the like accessing the locker system around the same time. As another example, parcels may be delivered to the wrong recipient, such as when the courier mis-types the recipient's name or selects an incorrect recipient through an interface of the parcel locker. In some cases, if a recipient sees a wrong parcel in the locker when they go to retrieve a different parcel (which is located in a different, also incorrect locker), they will simply close the locker door and leave the parcel in the locker.

Embodiments disclosed herein provide automated solutions and improvements that address these and other shortcomings of conventional parcel locker arrangements. Other than the features disclosed herein, the disclosed parcel locker system may operate in a similar fashion to conventional parcel lockers. For example, to deliver a parcel to a recipient, a courier may indicate to the system, via a user interface as disclosed herein, the intended recipient, information about the parcel, and the like. The system may then receive the parcel using processes as disclosed herein and store a record of the parcel, the intended recipient, and the locker in which the parcel was stored. This information is then provided to the recipient, who may access the appropriate locker using previously-established credentials, a one-time code generated and provided by the system, or the like.

Figure 1:
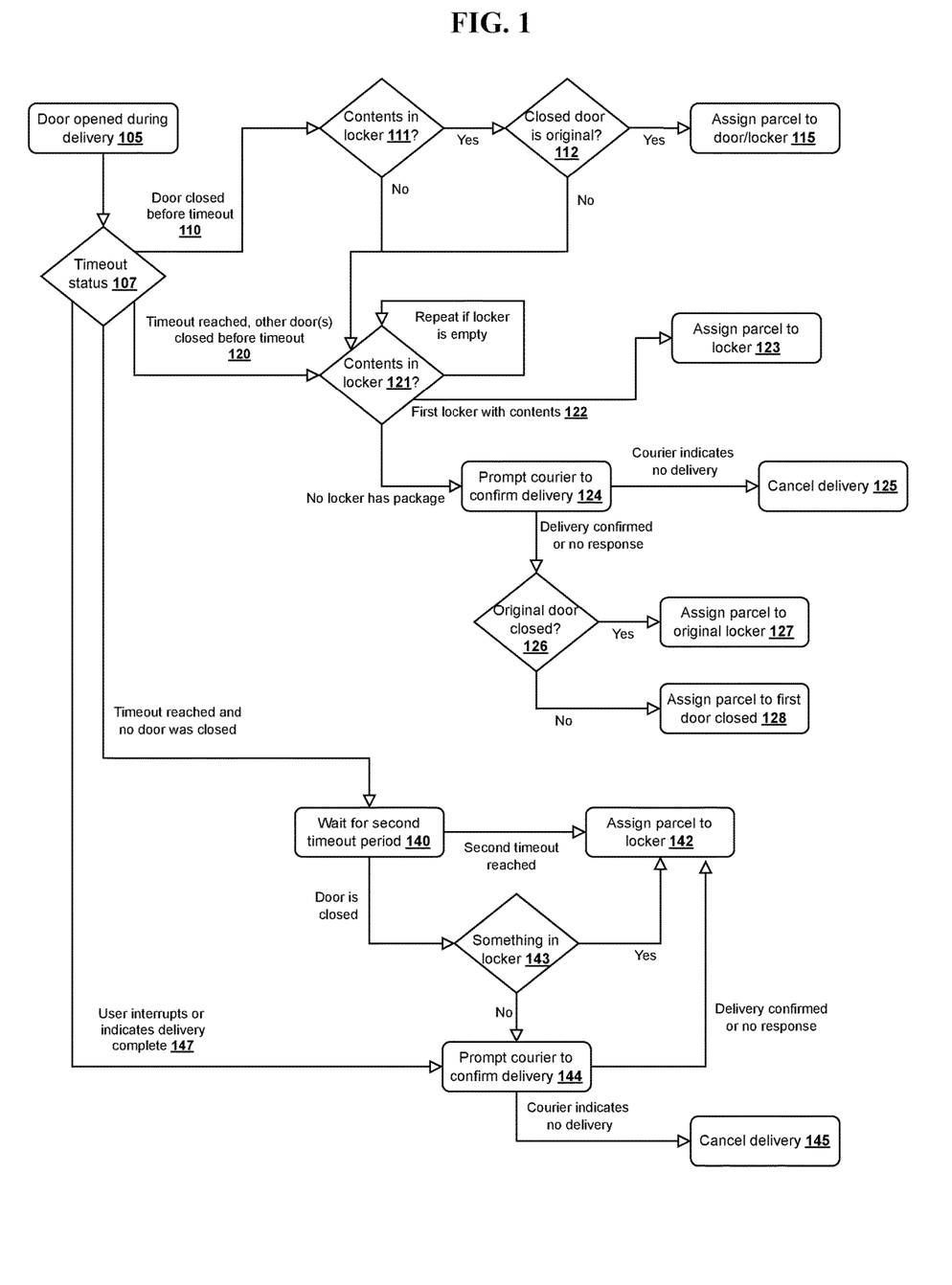
FIG. 1 shows an example process that may be used by a parcel locker system as disclosed herein during delivery of a parcel to the parcel locker device by a courier.

FIG. 1 shows an example process that may be used by a parcel locker system as disclosed herein during delivery of a parcel to the parcel locker device by a courier. Upon detecting a door being closed, for example via built-in electronic sensors, the system may check the closed door to see if the corresponding locker was assigned to a parcel for delivery to a recipient, and whether a package was in fact detected in the assigned locker. For example, internal sensors may be used to continuously, regularly, or sporadically to determine if a parcel is present in the locker. If a parcel is detected but was delivered to the wrong locker, i.e., a different locker than the system automatically assigned for the parcel, then the locker system automatically re-assigns the package to the locker to which it was actually delivered and updates an internal record of occupied lockers and delivered parcels accordingly.

For example, when a courier delivers a parcel, the locker system may instruct the courier to place the parcel in locker A. The courier may erroneously place the parcel in locker B, for example because the door for locker B was already open and the courier does not notice that a different door was opened for delivery of the parcel. Occupancy sensors discover the package and internal logic determines that the parcel should not be in locker B based on an internal database of occupied and available lockers. The recipient then may be notified of a parcel delivery as usual, which will be made available in locker B.

Another issue common in conventional parcel locker systems is where a first courier erroneously places a parcel in the wrong locker as described above (e.g., locker B when A was indicated) and, subsequently, a second courier attempts to deliver a parcel to locker B, which the conventional locker system shows as being available. In this case, couriers often will leave the parcel outside the parcel locker system since typically no other locker will be available and the system does not have a mechanism to re-assign the delivery to an available locker. Embodiments disclosed herein and as shown in FIG. 1 address this issue by re-assigning the parcel as described above.

The process begins at 105, when a courier opens a locker door during delivery. The door may be opened by the automated parcel locker system for example, in response to the courier scanning a bar code, address label, or other identifier on the parcel to be delivered and may prompt the courier to place the parcel being delivered into the indicated locker, the door for which is opened automatically by the parcel locker system.

At 107, a timeout period begins. The timeout period may be set in the configuration of the parcel locker system and generally is not changeable by a courier or recipient. In an example embodiment, the timeout period may be 15, 20, 30, 45, 60 seconds, or any other desired period of time. Generally it may be desirable for the timeout period to be sufficiently long that it allows time for the courier to position the parcel being delivered in the indicated locker, allowing for more difficult cases where the parcel is particularly heavy, oddly-shaped, close to the maximum size allowed by the indicated locker, or the like. It also may be desirable for the timeout period to be sufficiently short that it allows for errors to be detected and addressed as disclosed in further detail below.

If the original door is closed before the end of the timeout period at 110, the parcel locker system may determine if an object is now present in the locker, for example, based on weight, optical, or other sensors within the individual locker. It may be preferred for the sensor to be relatively simple, such as a pressure sensor, but in some cases other sensors may be desired such as where it is considered more important to verify the presence of a parcel upon delivery than to reduce maintenance on the sensors. In some cases, each locker or locker door may include a sensor that indicates when a door is opened and/or closed, or the open/closed state of the door. Such a sensor may be used in conjunction with an internal sensor that indicates the presence of an object within the locker, such as a pressure sensor, or the state of the door sensor may be used to infer the presence of an object within the associated locker. For example, where a process disclosed herein includes a locker door being opened, an object placed within the associated locker, and the locker being closed again, the system may consider a locker occupied after the door is closed, even where no separate sensor is used or no sensor is present that can directly verify the presence of an object in the locker. Accordingly, as used herein and unless indicated to the contrary explicitly or by context, a "sensor" may refer to a sensor that directly verifies the presence of an object within the locker, a door-state sensor that can be used to infer the presence of an object, or a combination thereof.

At 111, the system may determine, for example via one or more sensors within the locker for which the door was opened at 105, if there is something in the identified locker. If so, the process continues to 112 to determine if the door closed at 110 was the original door opened at 105 or a different door. If the door closed was the original door, at 115 the parcel being delivered may be "assigned" to that locker. To assign a parcel to a locker, the system may record recipient information in a database record, lookup table, or the like, which links the recipient information to locker, the parcel, or both.

Referring again to the determination at 111 regarding whether the originally-identified locker contains the parcel (or any other item), if there is nothing in the locker, the system may continue to wait for expiration of the timeout period via the loop at 121. Similarly, at 112, if the door closed before expiration of the timeout period is not the door for the original locker identified at 105, the system may continue to wait for expiration of the timeout period.

At 120, if the initial timeout period was reached without the original door opened at 105 being closed but one or more other doors was closed during the timeout period, the automated locker system may enter a loop at 121 in which each locker for which a door was closed during the timeout period is evaluated to determine if there is a parcel or other contents within the locker. The loop may be performed one locker at a time, for example in the order in which the doors were closed during the timeout period. To allow for this evaluation, the locker system may store a record of doors opened and/or closed during the timeout period and the absolute or relative time at which each was closed. The system may also simultaneously record information about any contents placed in each locker, such as a binary presence indicator, a weight, or the like; or sensors in each locker may be polled during the 121 loop to determine if the locker is empty or not. Upon finding a non-empty locker at 122, at 123 the system may assign the package being delivered at 105 to the locker.

If the loop at 121 completes without finding a non-empty locker, the system may conclude that no locker has received the package being delivered. The process may end at that point or it may continue to 124 and prompt the courier to confirm that a package was delivered. For example, the parcel locker system may display a prompt on a user interface asking the courier if a parcel was delivered or not. If the courier indicates that the parcel was delivered or no response is received (for example, within a set period of time), at 126 the locker system may check the original locker opened at 105 to determine if the original locker's door has been closed. If so, the parcel is assigned to the original locker at 127. Otherwise, at 128 the parcel is assigned to the first door that was closed, for example as determined at 121/122 or via similar evaluation loop that checks the door of other lockers in the system.

Referring again to 107, if the timeout period expires and no door has been closed, the parcel locker system may wait for a second timeout period at 140. The second timeout period may be any suitable period, though it may be preferred for the second timeout period to be longer than the first, for example, 45, 60, 75, 90, 120 seconds, or the like. If the second timeout period elapses without any doors being closed, at 142 the system may assign the parcel to the original door.

Referring again to 140, if a door is closed during the second timeout period, at 143 the system may poll the associated locker to determine if a parcel is in the locker. If the sensor indicates the locker is not empty at 143, the parcel is assigned to the locker for which the door was closed at 142. If the sensor indicates the locker is empty, at 144 the system may prompt the courier to confirm the parcel was delivered. For example, a query such as "was a package delivered?" may be displayed on an interface of the parcel locker system. If the courier confirms the parcel was delivered, the parcel is assigned to the locker at 142. If the courier indicates at 144 that the package was not delivered, the delivery process is cancelled at 145 and the system returns to the initial state to begin another delivery at 105.

At any point, the courier may cancel the delivery process, for example by selecting a "cancel" prompt from the system's user interface or by waiting for any of the timeout periods described herein to expire without placing a parcel in a locker. This option is available via the flow at 147, which may then trigger the confirmation prompt at 144 as previously disclosed.

The processes in FIG. 1 also may be used to determine if a recipient has placed other objects or materials into the locker from which they retrieved a parcel or into another open locker. For example, recipients often place random objects or trash into open lockers, such as when a recipient removes an object from shipping packaging but places the packaging into the locker to discard it instead of into a trash receptacle. In this case the system may automatically identify the presence of an unexpected object in the associated locker, note that the locker is not available to receive parcel deliveries (such as in an internal list as previously described), and notify a property manager, technician, or the like that an unexpected object was identified in the locker.

Figure 2:
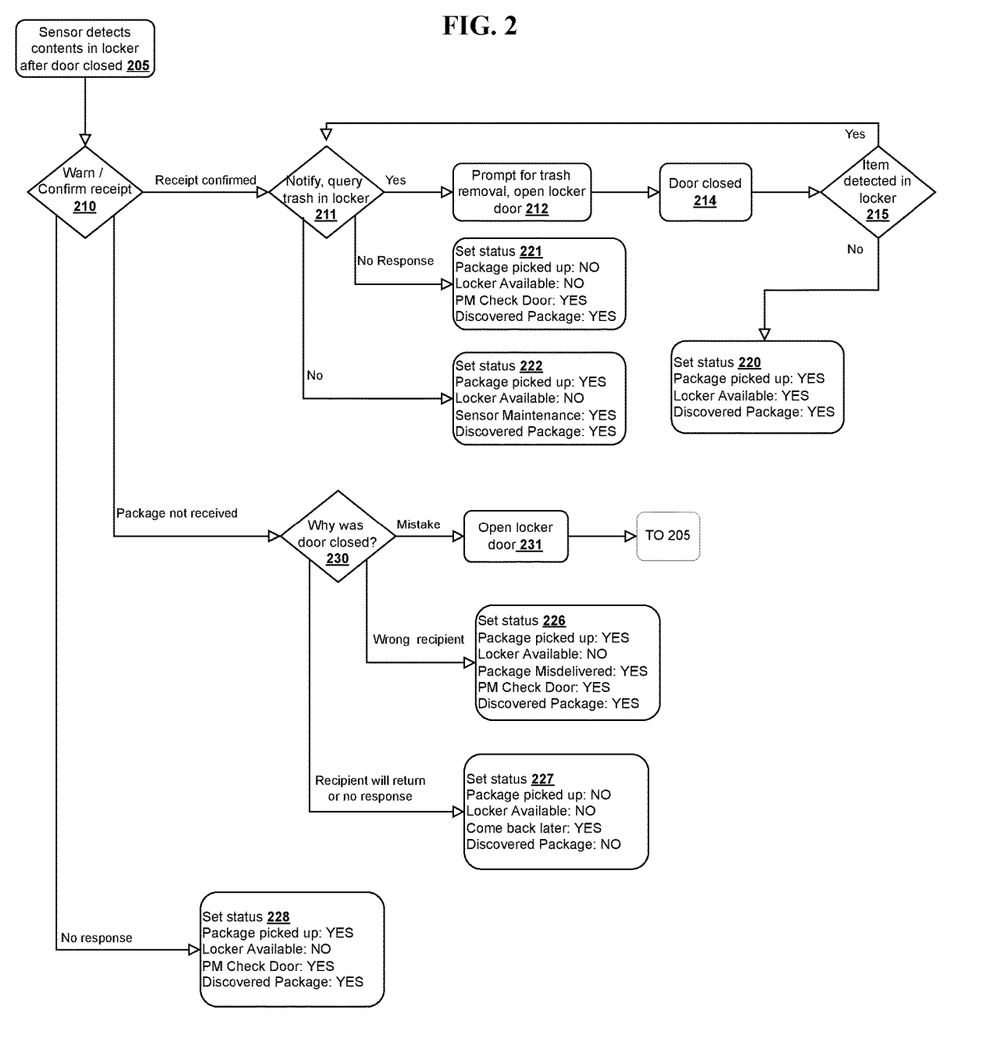
FIG. 2 shows example processes for a recipient accessing the parcel locker system.

FIG. 2 shows example processes for a recipient accessing the parcel locker system. The computerized logic addresses several scenarios: parcels being delivered to the wrong person, a recipient changing their mind about picking up their package now and instead wanting to get it later, or a hardware failure of the sensors associated with one or more lockers.

As previously described, parcels sometimes are delivered to the wrong recipient, for example where a courier types the name too fast at the touchscreen or selects an incorrect recipient from a list, such as selecting "B. Smith", which is associated with "Barbara Smith", when the courier intended to deliver to "Robert Smith," or the like. When a recipient opens a locker door and sees the wrong package, they often will just shut the door and leave the incorrect package in the locker. The process shown in FIG. 2 will detect that the package was not picked up and will beep, sound an alert, or otherwise draw the recipient's attention and ask whether they picked up their package as shown in FIG. 2 and as described in further detail herein. If the recipient selects a response such as "That was not my package," or otherwise indicates a mis-delivery of a package, the system may flag the locker/package as needing to be redelivered. Typically in this instance a notice will be sent to a property manager so they can go to the locker and properly re-deliver it, but other re-delivery processes may be used.

As another example, a recipient sometimes changes their mind about retrieving a delivered parcel. For example, they may stop by the locker on the way to the pool, thinking that they have received a small envelope, and then find that it's a large box. They don't want to be forced to take delivery of the package right then. In this case, the system will automatically detect that the package was not picked up and give the resident the option to come back later ("I'll come back") as described in further detail here.

As another example, presence sensors within each locker may be used to determine if something is in the locker. Sometimes those sensors will fail and give an inaccurate reading. When the system identifies a potentially-bad sensor, it may automatically notify a property manager to determine whether the associated locker is occupied or not. Based on their check, the system may automatically request a technician, such as from a remote management system, to fix the faulty sensors.

FIG. 2 shows an example process to address these and other events involved in a recipient receiving a package via an automated parcel locker system as disclosed herein. The process begins at 205, after a user has removed a parcel assigned to a locker (such as via the process described in FIG. 1), but a sensor in the locker indicates that the locker is not empty. At 210, the parcel locker system may warn the recipient that the locker is not empty, such as by displaying an informative prompt on the user interface. The prompt also may ask the recipient user to confirm that the package was received and/or removed from the locker. If no response is received, for example after a suitable timeout period, the system may set the status of the locker as shown at 228, to indicate that the package was received ("picked up") by the recipient, the locker is not available (due to the sensor indicating that it is already occupied), a manager review ("PM check") is required, and that a package or other item was found in the locker ("discovered package").

If the recipient indicates that the package was received at 210, the system may inform the recipient that items were found in the locker at 211. The system also may inquire whether the user placed trash or other non-parcel items in the locker and open the door at 212 so that the user can remove the trash or other non-parcel item(s). After the door is closed again at 214, the system may again poll the locker's sensor(s) to see if the locker is now empty.

At 215, if sensor again indicates that the locker is not empty, the process may return to 211. Alternatively, if no item is detected (i.e., the sensor(s) indicate that the locker is empty), the status may be set as shown at 220 to indicate that the parcel was delivered, the locker is now available, and that an item was detected in the locker.

If the recipient does not respond at 211, the status of the locker may be set as shown at 221 to indicate that the parcel was received (because the recipient indicated at 210 that the parcel was received), the locker is not available, a manager should check the locker/sensor, and that a parcel was discovered.

If the recipient responds at 211 that no trash or other item was placed in the locker, the status of the locker may be set as shown at 222 to indicate that the package was received, the locker is not available, maintenance should be performed on the sensor (because it indicates an item is present but the user confirmed that no item is present), and that an item was detected in the locker.

Referring again to step 210, if the user indicates that the parcel was not received, at 230 the system may prompt the user to indicate why the door was closed. If the user indicates that it was a mistake, the locker door is opened again at 231 and the process returns to 205.

If the user indicates at 230 that the door was closed and the parcel left in the locker because the parcel was not intended for the user as the recipient, at 226 the system sets the status of the locker at 230 to indicate that the package was delivered, the locker is not available, the package delivery was erroneous (package was "misdelivered"), a manager should check the locker, and that a package was detected in the locker. In this context, the status indicating that the package was delivered may refer only to the fact that the original delivery (to the incorrect recipient) is considered completed and should no longer be considered a pending pick up, without regard to whether the recipient was correct or not. The fact that the parcel was apparently delivered to the wrong recipient is addressed by the additional "misdelivered" status and the "PM check" status, which indicate that the parcel was delivered to the wrong recipient and that a manager of the system should verify the contents and correct recipient and re-deliver the parcel to the correct recipient if appropriate.

If, at 230, the user indicates that the door was closed without removing the parcel because the user will return to retrieve the parcel later, the status of the locker may be set at 227 to indicate that the package was not delivered, the locker is not available, the user will return to retrieve the parcel at a later time ("come back later"), and that a package was discovered in the locker.

Figure 3:
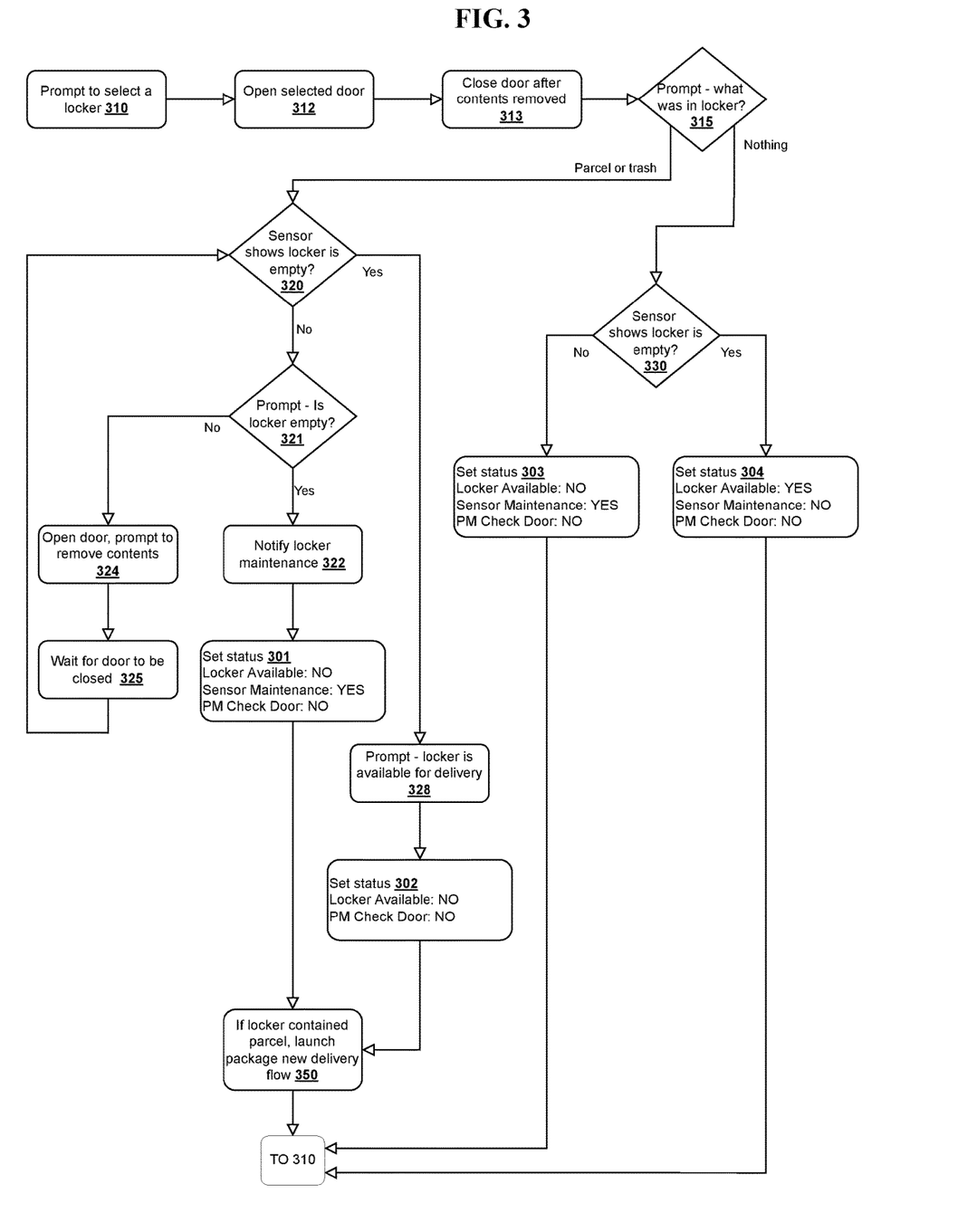
FIG. 3 shows example processes that may be used in conjunction with a property manager, technician, or other individual tasked with managing the parcel locker system.

FIG. 3 shows example processes that may be used in conjunction with a property manager, technician, or other individual tasked with managing the parcel locker system. The processes in FIG. 3 may be used, for example, when a locker is identified as having a problem as previously disclosed, such as a missing parcel, incorrectly-delivered parcel, foreign object present, or the like. More generally, in some cases, processes that rely on input from recipients such as shown in FIGS. 1 and 2 may consider the input from the recipients to be unreliable and require further verification, such as from a technician or property manager. When a property manager or similar individual needs to verify locker status or otherwise address potential issues with one or more lockers, the processes shown in FIG. 3 may be used.

The manager may routinely check the system to see if any lockers require attention, maintenance, or the like, or the automated parcel locker may notify the manager when one or more lockers requires intervention. At 310, the system may prompt the manager user to select a locker to examine or manage. For example, the system may have a list of lockers that have a status set which indicates attention is required, such as the "PM check" status described with respect to FIG. 2. Alternatively, the manager may activate a management mode of the locker system that allows the manager to indicate a locker that they believe requires attention. The locker system may have previously notified the manager that one or more lockers requires attention, for example, by sending an email, text message, or other indicator to the manager. The system also may include a visual indicator such as one or more lights associated with each locker that indicate the locker's status. Locker status also may be provided via the system's general user interface. Once the manager selects a locker at 310, the system opens the door for the selected locker at 312. If any items are in the locker, the manager may remove them and close the door at 313.

At 315, the parcel locker may prompt the manager to indicate what was found in the locker. If the manager indicates that the locker was empty, i.e., no item was found in the locker, at 330 the parcel locker may poll the associated sensor and/or consult a status of the locker to determine if the sensor indicates that the locker is empty. If the sensor indicates that the locker is not empty, i.e., the sensor incorrectly indicates that an item is in the locker, the status of the locker is set at 303 to indicate that the locker is not available, the sensor requires maintenance (due to incorrectly indicating the presence of an item in the locker). A maintenance status ("PM Check") may be set to NO or otherwise cleared, indicating that no further action is necessary until the sensor is serviced. If the sensor correctly indicates that the locker is empty, at 304 the status of the locker is cleared to indicate that the locker is available, no maintenance is needed, and no manager intervention is required. After polling the sensor and setting the locker status, the process returns to 310 to allow the manager to address any other lockers requiring evaluation.

Referring again to step 315, if the manager indicates that the locker contained a parcel or a non-parcel item such as trash, the locker's sensor is polled to determine if the sensor indicates the locker is empty. At 320, if the sensor confirms the locker is empty, the parcel locker system may notify the manager that the locker is available for use at 328 and set the status as shown at 302, to indicate that the locker is available and no manager intervention is required.

If the sensor indicates at 320 that the locker is not empty, the system may again confirm with the manager that the item was removed from the locker at 321. If the manager indicates that the locker is not empty, thereby confirming the sensor reading, the parcel locker system opens the associated locker door at 324 to allow the manager to remove the item and waits at 325 for the door to be closed. The process flow may then return to 320 to verify the locker contents via the locker sensor again.

If at 321 the manager indicate that the locker is in fact empty, at 322 the parcel locker system may notify the manager and/or a support system that the locker is in need of maintenance, for example to repair a faulty sensor. The locker status also may be set at 321 to indicate that the locker is not available, sensor maintenance is required, and no further manager intervention is required.

At 350, if the manager indicated at 315 that the locker contained a parcel, a new parcel delivery flow such as shown in FIG. 1 may be launched. This allows the manager to perform the process described with respect to a courier delivering a parcel initially, for example to allow the manager to "re-deliver" the parcel. Such a process may be beneficial, for example, to correct for a mis-delivery of the parcel to an incorrect recipient. If, at 315, the manager indicated that trash was found, the process may skip the launch of a new parcel delivery process and return immediately to 310 to allow for further manager intervention of other lockers.

FIGS. 1-3 show examples of various processes and parameters that may be used with the various embodiments disclosed herein, such as illustrative timeout periods, polling times, and the like. It will be understood that these examples are provided by way of illustration and other values may be used without departing from the scope or content of the present disclosure.

Embodiments disclosed herein also may provide instructional and/or informative prompts via a user interface as shown in FIG. 1. For example, at 105, the system may prompt the courier to place the parcel being delivered into the locker indicated by the system. As another example, if one or more doors are closed during an expected delivery time (i.e., during the first timeout period at 107) and no lockers contain a parcel, the interface may prompt the courier to indicate whether the parcel was delivered at 124. In the case of a "yes" response or no response from the courier, the system may automatically determine if the originally-assigned locker door was closed and, if so, assign the parcel to the originally-assigned locker. The interface may then display an indication that the parcel was delivered.

Figure 4:
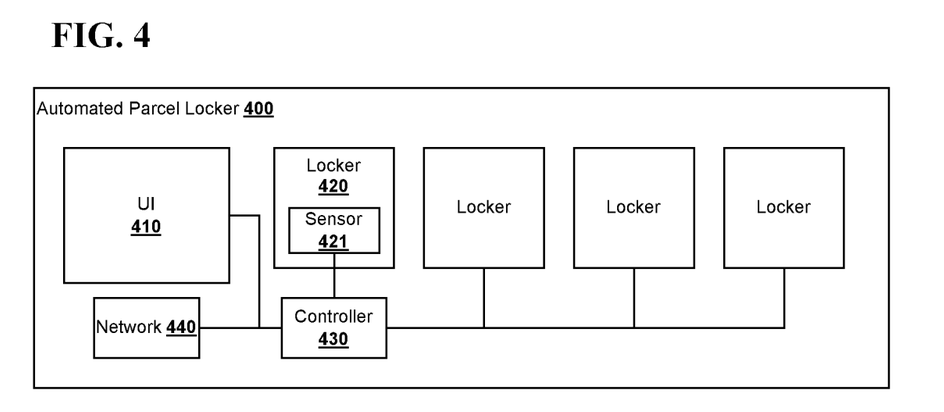
FIG. 4 shows a schematic illustration of an example automated parcel locker system as disclosed herein.

FIG. 4 shows a schematic illustration of an automated parcel locker system as disclosed herein. The parcel locker system 400 may include any number of individual lockers 420, each of which may be associated with one or more sensors 421. The sensors may include, for example, a pressure, weight, optical, or similar sensor to detect whether an item is present in the locker, a door open/close sensor to indicate the status of a door as open or closed, and/or an open/close sensor that indicates when a door changes state, e.g. from open to closed or vice-versa, or any combination thereof. For example, one or more sensors may be used to determine whether an item is present in the locker, which information may be provided via an electronic signal to the controller 430 and used in the processes shown in FIGS. 1-3 wherever a determination is made regarding the presence or absence of one or more items in the locker. Similarly, any suitable type of door sensor may be used to determine the status or activity of the locker door, which information may be provided via electronic signal to the controller 430 and used in the processes described in FIGS. 1-3 whenever a door status or state is used.

A user interface 410 may include a display screen and one or more interface components such as a keyboard, touch screen, visual indicators, or the like. A controller 430 may include one or more processors and software to allow for control and management of the lockers 420, sensors 421, and user interface 410. The components may be communicatively coupled such as via a communications bus, local wireless or wired network, or the like.

During operation of the processes disclosed with respect to FIGS. 1-3, generally the controller 430 may direct operation of the lockers 420 and their associated doors, sensors 421, and the like. The controller 430 also may generate and provide user interface prompts and other components to the interface 410, receive input from the users via the same, and operate the parcel locker system 400 according to the same. The parcel locker 400 also may be in communication with other components not pictured, such as remote management systems, property management systems that otherwise manage residences or businesses served by the parcel locker system 400, such as via wired or wireless network connections 440.

Embodiments disclosed herein prove improvements and extensions to computerized, automated parcel delivery and reception systems. Such systems rely the computerized communication, processing, and storage systems to provide the efficiency and volume of parcel delivery required by modern shipping and receiving systems. As such, the processes and systems disclosed herein could not reasonably be performed by humans, or in the human mind, or the like, due to the necessity of interfacing with existing computerized shipping systems. For example, the processes described with respect to FIGS. 1-3 could not be performed without the specialized devices, computer processors, and software disclosed in relation to the same. Furthermore, automated parcel locker systems as disclosed herein are designed to prevent access by arbitrary users to the information stored therein, including the occupancy status of each locker, the resident/recipient information stored in the local database and the like. Accordingly, automated techniques and systems as disclosed herein are necessary to effectuate delivery of parcels to the automated parcel locker as disclosed, since the associated systems do not provide human-readable information and/or huma-accessible components, other than as disclosed herein.

More generally, various embodiments may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, computer-readable instructions to implement techniques disclosed herein may be stored on a computer-readable storage medium and may be implemented by a general-purpose processor, execution of which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

The above description includes several example implementations. However, it will be understood by one of skill in the art that the invention disclosed herein is not limited to the implementations described and can be practiced with modification and alteration within the spirit and scope of the appended claims. The description is thus illustrative instead of limiting.

The invention claimed is:

1. A computerized automated parcel locker system comprising:
 a housing;
 a plurality of lockers disposed within the housing, each locker of the plurality of lockers having an associated door that is openable to allow access to the interior of the locker;
 a plurality of sensors, each sensor associated with a locker of the plurality of lockers and configured to provide a signal indicating whether the associated locker is empty or contains an item;
 a user interface capable of providing information about each of the plurality of lockers based on the signal provided by each of the plurality of sensors;
 a controller in signal communication with each associated door, the user interface, and the plurality of sensors;
 wherein, responsive to a first door of a first locker of the plurality of lockers being opened and based on a timeout period, the controller is configured and arranged to:
  responsive to a second door of a second locker being closed before expiration of the timeout period and to the first door not being closed during the timeout period, determining that a parcel was placed in the second locker and, in response, assigning the parcel to the second locker; or responsive to no doors being closed before expiration of the timeout period, assigning the parcel to the first locker or cancelling delivery of the parcel to the automated parcel locker system; and wherein, responsive to the first door of the first locker of the plurality of lockers being opened, an expiration of the first timeout period, and a determination by the controller that no item has been added to any locker during the timeout period, the controller is configured to prompt a user to confirm that the parcel was delivered; and responsive to receiving a confirmation from the user, the controller is configured to assign the parcel to the first locker, or, responsive to a lack of response from the user during a second timeout period, assign the parcel to the second locker.

2. The parcel locker system of claim 1, wherein the step of determining, by the controller, that no item has been added to any locker during the timeout period is based on signals received from the plurality of sensors.

3. The parcel locker system of claim 2, further comprising, subsequent to the first door being opened and the second door being closed before expiration of the timeout period, wherein the first door is not closed during the timeout period, and subsequent to determining that the parcel was placed in the second locker:

determining that the second door was opened and closed;

receiving a signal from a sensor of the second locker that, subsequent to the second door being closed, an item is in the second locker;

providing a notification via the user interface indicating that an item is in the second locker; and responsive to receiving a response to the notification, the response indicating that no item is in the second locker, setting a status of the second locker to indicate that the locker requires maintenance.

4. The parcel locker system of claim 3, wherein the status indicates that the sensor of the second locker requires servicing.

5. The parcel locker system of claim 1, wherein the plurality of sensors include pressure sensors, optical sensors, door open/close state sensors, or a combination thereof.

6. The parcel locker system of claim 1, further comprising a communication interface configured to allow communication with a remote parcel locker management system and/or a local property management system.

7. The parcel locker system of claim 1, wherein the parcel locker system is configured to automatically address parcels delivered to an incorrect locker, missing parcels, and/or objects other than delivered parcels placed into any of the plurality of lockers.

8. A method, performed by a computerized controller in a computerized automated parcel locker system including a plurality of lockers, each having an associated door, and a plurality of sensors, configured to provide signals indicating whether each locker is empty or contains an item, the method comprising:

responsive to a first door of a first locker of the plurality of lockers being opened and based on a timeout period:

responsive to a second door of a second locker being closed before expiration of the timeout period and to the first door not being closed during the timeout period, determining that a parcel was placed in the second locker and, in response, assigning the parcel to the second locker; or responsive to no doors being closed before expiration of the timeout period, assigning the parcel to the first locker or cancelling delivery of the parcel to the automated parcel locker system; and responsive to the first door of the first locker of the plurality of lockers being opened and based on the timeout period:

responsive to expiration of the first timeout period and to determining, by the controller, that no item has been added to any locker during the timeout period, prompting a user to confirm that the parcel was delivered; and responsive to receiving a confirmation from the user, assigning the parcel to the first locker, or, responsive to a lack of response from the user during a second timeout period, assigning the parcel to the second locker.

9. The method of claim 8, wherein the step of determining, by the controller, that no item has been added to any locker during the timeout period is based on signals received from the plurality of sensors.

10. The method of claim 9, further comprising, subsequent to the first door being opened and the second door being closed before expiration of the timeout period, wherein the first door is not closed during the timeout period, and subsequent to determining that the parcel was placed in the second locker:

determining that the second door was opened and closed;

receiving a signal from a sensor of the second locker that, subsequent to the second door being closed, an item is in the second locker;

providing a notification via the user interface indicating that an item is in the second locker; and responsive to receiving a response to the notification, the response indicating that no item is in the second locker, setting a status of the second locker to indicate that the locker requires maintenance.

11. The method of claim 8 further comprising, subsequent to the parcel being assigned to the first locker or to the second locker, notifying a recipient of the parcel that the parcel has been delivered.

12. The method of claim 11, wherein the notification is provided via email or text message.

* * * * *